(12) United States Patent
Konno

(10) Patent No.: US 8,260,064 B2
(45) Date of Patent: Sep. 4, 2012

(54) IMAGE PROCESSING APPARATUS, IMAGE PROCESSING METHOD, COMPUTER-READABLE MEDIUM AND COMPUTER DATA SIGNAL

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 824 days.

(21) Appl. No.: 12/363,337

(22) Filed: Jan. 30, 2009

(65) Prior Publication Data

US 2010/0054612 A1 Mar. 4, 2010

(30) Foreign Application Priority Data

Aug. 28, 2008 (JP) ................................. 2008-219338

(51) Int. Cl.
*G06K 9/54* (2006.01)
*G06F 17/28* (2006.01)
*G10L 15/00* (2006.01)
*G10L 11/00* (2006.01)

(52) U.S. Cl. ............ 382/229; 382/305; 704/2; 704/251; 704/277

(58) Field of Classification Search .................. 382/229, 382/305, 185; 704/1–10, 251, 257, 277
See application file for complete search history.

(56) References Cited

U.S. PATENT DOCUMENTS

| | | | | | |
|---|---|---|---|---|---|
| 4,987,497 | A | * | 1/1991 | Yoshimura | 358/452 |
| 5,274,468 | A | * | 12/1993 | Ojha | 358/448 |
| 5,517,409 | A | * | 5/1996 | Ozawa et al. | 704/3 |
| 5,727,082 | A | * | 3/1998 | Sugishima | 382/229 |
| 6,148,105 | A | * | 11/2000 | Wakisaka et al. | 382/190 |
| 6,539,116 | B2 | * | 3/2003 | Takaoka | 382/229 |
| 6,937,762 | B2 | * | 8/2005 | Fujiwara | 382/182 |
| 2003/0200505 | A1 | | 10/2003 | Evans | |
| 2004/0255242 | A1 | | 12/2004 | Price et al. | |
| 2006/0217957 | A1 | | 9/2006 | Sato et al. | |
| 2006/0217960 | A1 | | 9/2006 | Kato et al. | |

(Continued)

FOREIGN PATENT DOCUMENTS

EP 1802094 A2 6/2007

(Continued)

OTHER PUBLICATIONS

Australian Office Action, Application No. 2009200420, dated Jul. 27, 2010.

(Continued)

*Primary Examiner* — Sheela Chawan
(74) *Attorney, Agent, or Firm* — Sughrue Mion, PLLC

(57) ABSTRACT

An image processing method includes receiving an image including a writing, detecting a position of the writing in the received image, detecting a position of a character image in the received image, performing character recognition on the detected character image, comparing the position of the detected writing with the position of the detected character image to associate the writing with a result of the character recognition, translating the result of the character recognition so as to be recognizable as a translation of the result of the character recognition associated with the writing, generating an image of the translation result associated with the writing, so as to be output in a format different from a format of an image of a translation result that is not associated with the writing, and outputting the image of the translation result associated with the writing.

10 Claims, 10 Drawing Sheets

U.S. PATENT DOCUMENTS

2008/0144131 A1    6/2008    Jung et al.

FOREIGN PATENT DOCUMENTS

| | | |
|---|---|---|
| GB | 2261792 A | 5/1993 |
| JP | 2-253377 A | 10/1990 |
| JP | 5-54072 A | 3/1993 |
| JP | 5-266075 A | 10/1993 |
| JP | 5-324720 A | 12/1993 |
| JP | 06-004574 A | 1/1994 |
| JP | 07-021186 A | 1/1995 |
| JP | 7-23210 A | 1/1995 |
| JP | 8-30624 A | 2/1996 |
| JP | 10-164356 A | 6/1998 |
| JP | 3213197 B2 | 7/2001 |
| JP | 2005-014237 A | 1/2005 |
| JP | 3636490 B2 | 1/2005 |
| JP | 2006-109142 A | 4/2006 |
| JP | 2006-276918 A1 | 10/2006 |
| JP | 2006-276919 A | 10/2006 |
| WO | 00/72130 A1 | 11/2000 |

OTHER PUBLICATIONS

Notification of Reason for Refusal dated Jun. 8, 2010, issued in counterpart Japanese Application No. 2008-219338.

Dengel, A. et., al. "Techniques for Improving OCR Results", Handbook of Character Recognition and Document Image Analysis, World Scientific Publishing Company, 1997, pp. 227-258.

European Search Report issued on Nov. 19, 2010 in the corresponding European Patent Application No. 09001252.7.

Office Action issued in counterpart Australian Application No. 2009200420 dated Feb. 8, 2010.

* cited by examiner

FIG. 5B
```
520
"Our valuing" it
It constitutes a personal state based
on posture of responsibility as the
social member and the business,
human nature in ten value that  ▬ 521
At first, for a start point realizing the will
that I declared with   | Words A |  522A
       522B  ▢
at with responsibility, you must
value the satisfaction of the visitor.
```
FIG. 5A
510 — Japanese text slide with highlighted regions 512 and 511.

"Our valuing" it 「私たちが大切にすること」

  で宣言した意志

631 It constitutes a personal state based on posture of responsibility as the social member and the business, human nature in ten value that 大切にしていかなければなりません。

は、社会の

Words A  Words A
622A

At first, for a start point realizing the will that I declared with 一員としての責任とビジネスの姿勢、

632

 at with responsibility, you must 人間性をベースにした個人の在りよう value the satisfaction of the visitor. を10の価値で構成しています。

"Our valuing" it

It constitutes a personal state based on posture of responsibility as the social member and the business, human nature in ten value that We value" ―821

At first, for a start point realizing the will that I declared with "the thing which we ―822A aim" at with responsibility, you must ―822B value the satisfaction of the visitor.

"Our valuing" it
「私たちが大切にすること」

It constitutes a personal state based on posture of responsibility as the social member and the business, human nature in ten value that 「we value」
ポイントとして、まずお客様の満足を 大切にしていかなければなりません。

At first, for a start point, realizing the will 「私たちが大切にすること」は、社会の that I declared with "the thing which we 一員としての責任とビジネスの姿勢、aim" at with responsibility, you must 人間性をベースにした個人の在りよう value the satisfaction of the visitor. を10の価値で構成しています。

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-219338 filed Aug. 28, 2008.

BACKGROUND

1. Technical Field

The invention relates to an image processing apparatus, an image processing method, a computer-readable medium and a computer data signal.

2. Related Art

There is a technology of performing character recognition on a character image in a document image and then translating it into a different language.

There is also a technology of processing a document based on a writing that has been made on the document.

SUMMARY

According to an image processing apparatus includes an image receiving unit, a writing detection unit, a character position detection unit, a character recognition unit, an association unit, a translation unit, a translation image generation unit and a translation image output unit. The image receiving unit receives an image including a writing. The writing detection unit detects a position of the writing in the image received by the image receiving unit. The character position detection unit detects a position of a character image in the image received by the image receiving unit. The character recognition unit performs character recognition on the character image detected by the character position detection unit. The association unit compares the position of the writing detected by the writing detection unit with the position of the character image detected by the character position detection unit to associate the writing with a result of the character recognition performed by the character recognition unit. The translation unit translates the result of the character recognition performed by the character recognition unit so as to be recognizable as a translation of the result of the character recognition associated with the writing by the association unit. The translation image generation unit generates an image of the translation result associated with the writing, so as to be output in a format different from a format of an image of a translation result that is not associated with the writing. The translation image output unit outputs the image generated by the translation image generation unit.

BRIEF DESCRIPTION OF THE DRAWINGS

Exemplary embodiment(s) of the invention will be described in detail based on the following figures, wherein:

FIGS. 5A and 5B are explanatory views showing a processing example 1-1 according to the exemplary embodiment of the invention;

FIGS. 6A and 6B are explanatory views showing a processing example 1-2 according to the exemplary embodiment of the invention;

FIGS. 8A and 8B are explanatory views showing a processing example 2-1 according to the exemplary embodiment of the invention;

FIGS. 9A and 9B are explanatory views showing a processing example 2-2 according to the exemplary embodiment of the invention.

DETAILED DESCRIPTION

Hereinafter, exemplary embodiments of the invention will be described with reference to the drawings.

Figure 1:
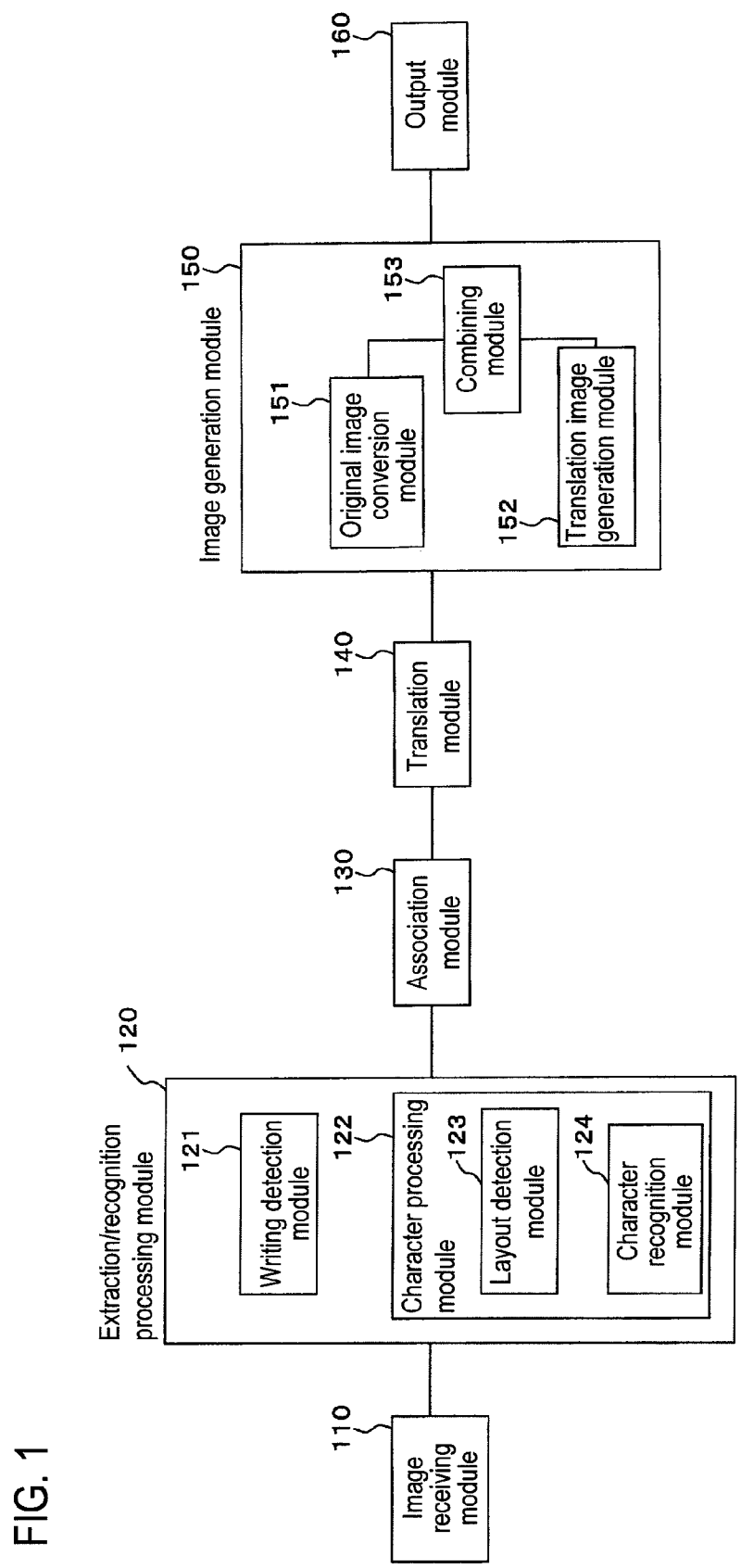
FIG. 1 is a conceptual module block diagram of a structure example according to an exemplary embodiment of the invention.

FIG. 1 is a conceptual module block diagram of a structure example according to this exemplary embodiment.

A module generally refers to a logically separable part such as software (computer program) or hardware. Therefore, the modules in this exemplary embodiment refer not only to modules in computer programs but also to modules in hardware structures. Therefore, the description of this exemplary embodiment is also description of a computer program, a system, and a method. Here, for convenience of explanation, "store", "stored", and a word equivalent thereto are used, and these words mean, when the exemplary embodiment is a computer program, storing something in a storage or controlling so that something is stored in a storage. While the modules correspond to functions on a substantially one to one basis, in implementation, one module may be constituted by one program, plural modules may be constituted by one program, or one module may be constituted by plural programs. Moreover, plural modules may be executed by one computer, or one module may be executed by plural computers in a distributed or parallel environment. One module may include another module. Moreover, hereinafter, "connection" is used to mean a logical connection (data transmission and reception, instruction, reference relationship between pieces of data) as well as a physical connection.

Moreover, a system or an apparatus is constituted by plural computers, pieces of hardware, apparatuses or the like connected by a communication device such as a network (including a one-to-one correspondence communication connection). When it is implemented by one computer, piece of hardware, apparatus or the like is also included. "Apparatus" and "system" are used as words synonymous with each other. "Predetermined" refers to being before processing in interest, and is used to have meanings including being determined not only before start of processing of this exemplary embodiment but also according to a situation or condition at that time or according to a situation or condition up to that time even after the start of the processing of this exemplary embodiment.

This exemplary embodiment includes, as shown in FIG. 1, an image receiving module 110, an extraction/recognition processing module 120, an association module 130, a translation module 140, an image generation module 150, and an output module 160.

The image receiving module 110 is connected to the extraction/recognition processing module 120, receives an image, and passes the image to the extraction/recognition processing module 120. Receiving an image includes reading an image with a scanner, receiving an image by fax, and reading an image from an image database or the like. The image includes a writing made by a user as well as a character image. The number of images may be one or more than one. Contents of the image may be a business document, an advertising brochure, or the like. This image is an image to be translated. Specifically, the writing included in the image refers to, for example, an image that is added to indicate a portion where information described in a document should be hidden when the document is made open to public or an image that is added to indicate that a portion is important among information described in a document and to attract attention. The writing includes an underline or a box drawn with a colored pen or a portion filled with a translucent marker (highlighter, etc.) irrespective of whether or not the writing is handwriting. When a character image in an image is to be painted out, the character image is painted out to the extent that the character image can be read (to the extent that character recognition is possible).

The extraction/recognition processing module 120 is connected to the image receiving module 110 and the association module 130, and has a writing detection module 121 and a character processing module 122. The extraction/recognition processing module 120 receives the image from the image receiving module 110, detects a position of the writing in the image, detects a position of the character image, and recognizes the character image. Then, the extraction/recognition processing module 120 passes the detection results and the character recognition result to the association module 130.

The writing detection module 121 detects the position of the user's writing in the image received by the image receiving module 110. To detect the position of the writing, for example, the received image is separated in hue to thereby extract an image having a predetermined color and detect coordinates of the extracted image. Alternatively, a linear image such as an underline may be recognized, and coordinates of the recognized linear image may be detected. Then, the writing detection module 121 passes the result of the detection to the association module 130. Further, the writing detection module 121 may detect a type of the writing. Examples of the type of the writing include a color of the writing, a shape (a line, an area or the like) of the writing, and a relationship between the writing and a character(s) (an area including a character(s), an underline drawn under a character (s), or the like). The detection processing may include an analysis of a color after the hue separation, an analysis of an aspect ratio, an analysis of a positional relationship between the writing and the character(s) detected by a layout detection module 123, or the like.

Figure 3:
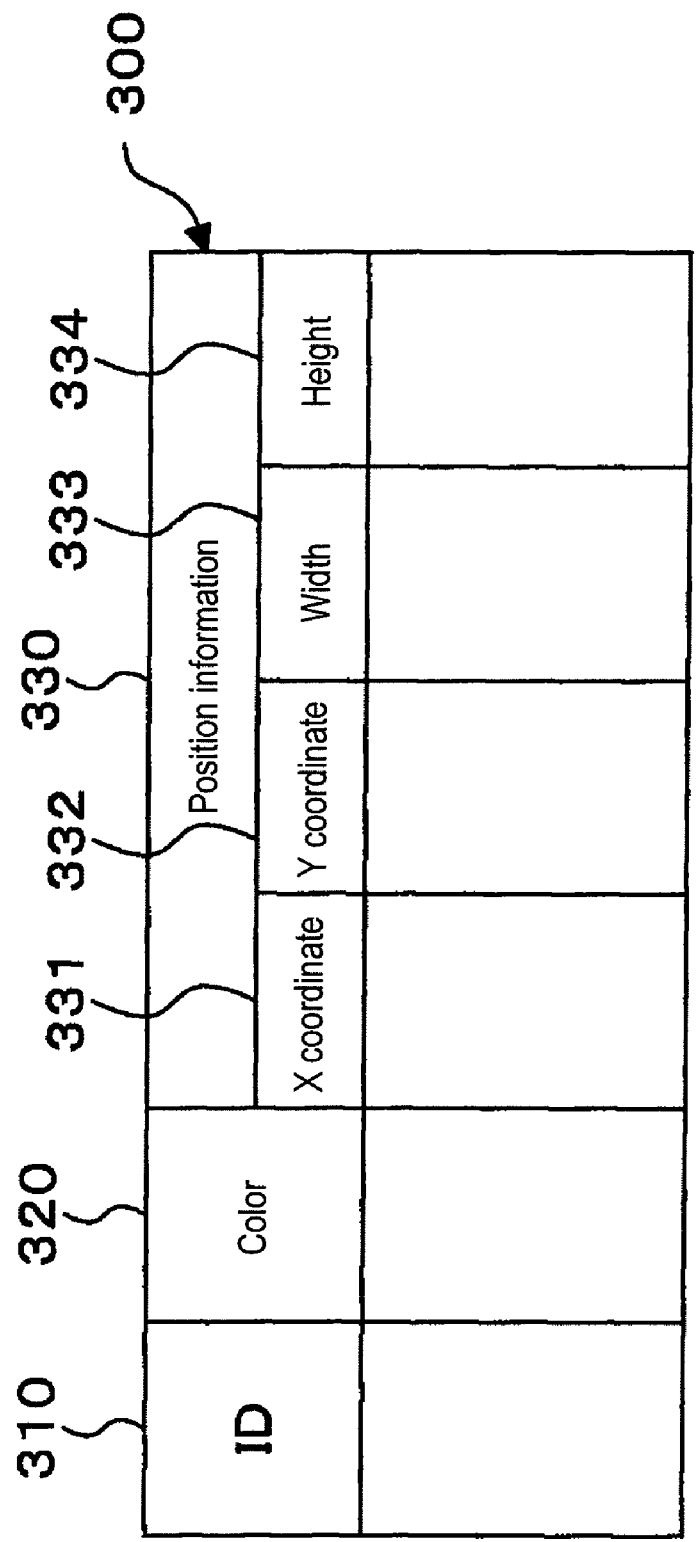
FIG. 3 is an explanatory view showing an example of the data structure of a specified portion table.

FIG. 3 is an explanatory view showing an example of the data structure of a specified portion table 300 representative of the writing detected by the writing detection module 121. The specified portion table 300 includes an ID column 310, a color column 320, and a position information column 330. The ID column 310 stores an identifier for uniquely identifying the writing. The color column 320 stores a color as the type of the writing. The position information column 330 stores the position of the writing, and includes an x-coordinate column 331, a y-coordinate column 332, a width column 333, and a height column 334. The x-coordinate column 331 and the y-coordinate column 332 store the coordinates of an upper left position of an area (for example, a rectangle) where the writing is present, the width column 333 stores the width of the area, and the height column 334 stores the height of the area. The coordinates may be absolute coordinates (the upper left position of the image is defined as the origin point, the rightward direction corresponds to the x-axis and the downward direction corresponds to the y-axis) in the image, or may be relative coordinates.

The character processing module 122 receives the image from the image receiving module 110, detects layout including the position of a character image that is present in the image, and recognizes the character image. Then, the character processing module 122 passes the position of the character image and the result of the character recognition to the association module 130. The character processing module 122 includes the layout detection module 123 and a character recognition module 124.

The layout detection module 123 detects the position of the character image in the image received by the image receiving module 110. For the detection of the character image position, a character image extraction process that is generally known in the character recognition technology may be used. For example, a histogram of black pixels (the frequency distribution of black pixels) in the horizontal or vertical direction in the image is generated, a line is extracted by extracting an area where the frequency is equal to or higher than a predetermined threshold value, and a histogram of black pixels in the vertical or horizontal direction in the line is generated, thereby extracting a character image. Alternatively, a character image may be extracted by using the sizes of a blank area and a predetermined character image. Further alternatively, the position of the character image may be detected by using a technology to extract a layout in an image. In that case, the process can be performed not only on text areas constituted by character images but also on figures, tables, and the like. Then, the layout detection module 123 passes the position of the character image, which is the detection result, to the character recognition module 124.

The character recognition module 124 performs character recognition on the character image detected by the layout detection module 123. For the character recognition process, a generally known character recognition technology may be used. For example, it may be performed to extract features (the number of lines, etc.) of the character image, compare a position in the feature space with characters in a dictionary and perform the character recognition (associate with a character code). Then, the character recognition module 124 associates the position of the character image with the character recognition result, and passes them to the association module 130.

Figure 4:
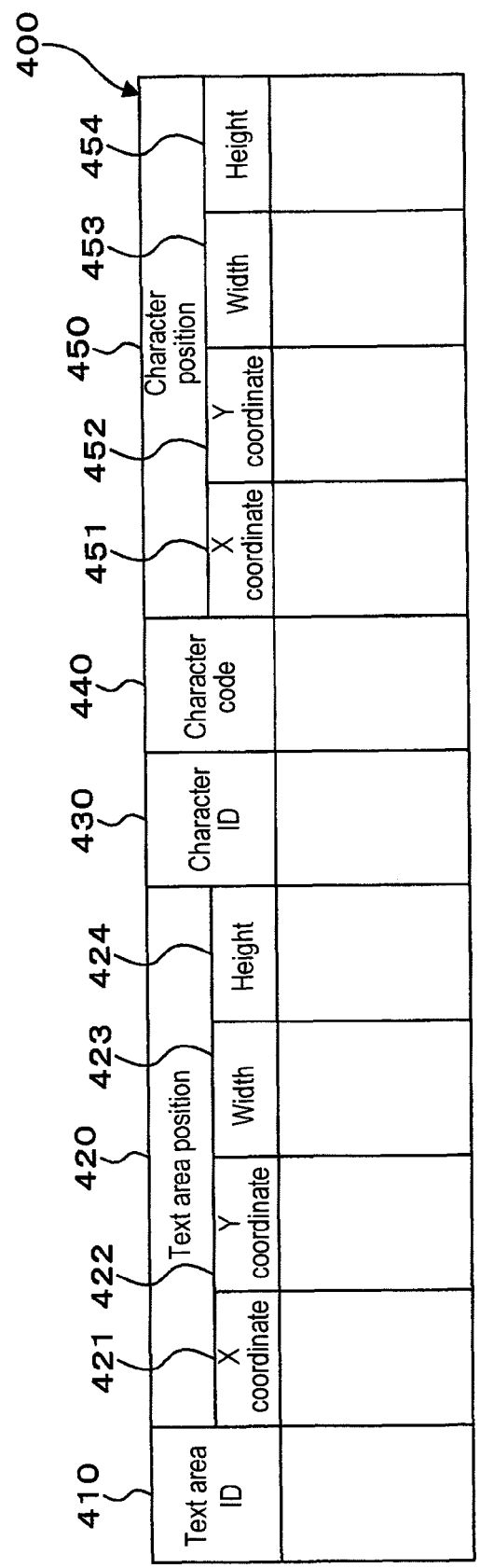
FIG. 4 is an explanatory view showing an example of the data structure of a character position table.

FIG. 4 is an explanatory view showing an example of the data structure of a character position table 400 that is the result of the process performed by the character processing module 122. The character position table 400 includes a text area ID column 410, a text area position column 420, a character ID column 430, a character code column 440, and a character position column 450. The text area ID column 410 stores an identifier for uniquely identifying a text area in the image. The text area position column 420 stores the position of the text area, and includes an x-coordinate column 421, a y-coordinate column 422, a width column 423, and a height column 424. The x-coordinate column 421 and the y-coordinate column 422 store coordinates of the upper left position of the text area (for example, a rectangle), the width column 423 stores the width of the text area, and the height column 424 stores the height of the text area. The character ID column 430 stores an identifier for uniquely identifying a character image that is present in the text area. The character code column 440 stores a result (character code) of the character recognition performed by the character recognition module 124, corresponding to the character image. The character position column 450 stores the position of the character image, and includes an x-coordinate column 451, a y-coordinate column 452, a width column 453, and a height column 454. The x-coordinate column 451 and the y-coordinate column 452 store coordinates of the upper left position of the character image (for example, a rectangle), the width column 453 stores the width of the character image, and the height column 454 stores the height of the character image. Contents in the text area ID column 410, the text area position column 420, the character ID column 430, and the character position column 450 are mainly generated by the layout detection module 123, and contents of the character code column 440 are mainly generated by the character recognition module 124. Moreover, contents in the character position column 450 may be modified by re-extracting the character image according to the result of the character recognition performed by the character recognition module 124.

The association module 130 is connected to the extraction/recognition processing module 120 and the translation module 140. The association module 130 compares the position of the writing detected by the writing detection module 121 with the position of the character detected by the layout detection module 123, and associates the writing with the result of the character recognition performed by the character recognition module 124. Then, the association module 130 passes the character recognition result and the association result to the translation module 140.

That is, the association module 130 searches for the position of the character corresponding to the position of the writing. This search process includes searching for not only the position of the character that coincides with the position of the writing, but also a position of a character that is in the neighborhood of the position of the writing when a writing area and a character area overlap each other. The "neighborhood" includes the periphery of the position of the target writing, specifically, within a predetermined distance from the position of the target writing. The distance may measured, for example, based on a distance from a center of the writing to a center of the character, a distance from the periphery of the writing to the periphery of the character (the shortest distance therebetween), or the like.

Then, the character recognition result (character where the writing is made) corresponding to the position of the character is extracted. For example, specifically, when the character recognition result is expressed in a description language such as HTML (hypertext markup language), the character where the writing is made may be surrounded by tags (that are reserved words representing that a writing is made). When a table format like the character position table 400 shown in the example of FIG. 4 is adopted, a column representative of whether or not a character is one where a writing is made may be provided.

Moreover, it may be determined as to whether or not characters where the writing is made constitute a character string having a meaning in that language. Examples of the character string having a meaning include a word, a phrase, and a sentence. Moreover, the determination is made, for example, according to whether or not the characters are stored in a word dictionary that is prepared in advance or whether or not the characters can be extracted by parsing or the like. When it is determined that the character(s) do not constitute a character string having a meaning, it may be performed to add or delete a preceding or succeeding character until a character string having a meaning is obtained and regard it as the character where the writing is made. When the character where the writing is made is modified, the result of the detection by the writing detection module 121 may be modified as well according to the modification of the character.

The translation module 140 is connected to the association module 130 and the image generation module 150. The translation module 140 translates the result of the character recognition performed by the character recognition module 124 so as to be recognizable as a translation of the result of the character recognition associated with the writing by the association module 130. Then, the translation module 140 passes the translation result to the image generation module 150.

That is, the translation module 140 translates the result of the character recognition passed from the association module 130. For the translation processing, a generally known (machine) translation technology may be used. For example, the result of the character recognition is parsed, and by using a dictionary in which words in a first language and words in a second language are associated with each other, it is translated into the second language.

In the translation, the association result passed from the association module 130 is reflected also in the translation result. For example, specifically, when the translation result is expressed in a description language such as HTML, the result of translation of a character(s) where the writing is made may be surrounded by tags (that are reserved words representing that a writing is made).

The image generation module 150 is connected to the translation module 140 and the output module 160, and includes an original image conversion module 151, a translation image generation module 152, and a combining module 153. The image generation module 150 receives the translation result from the translation module 140, generates an image including the translation result, and passes it to the output module 160. The image generated by the image generation module 150 may be a file described in a page description language or the like.

The original image conversion module 151 is connected to the combining module 153, and after the translation module 140 performs the translation, the original image conversion module 151 converts the character image in the image received by the image receiving module 110, based on the position of the writing detected by the writing detection module 121. For example, specifically, the original image conversion module 151 may convert into an image that hides the character image where the writing is made, based on the position of the writing detected by the writing detection module 121. More specifically, this conversion includes painting out of the character image with black called sanitizing or converting into a predetermined character image that is prepared as a substitute for the character image. Then, the original image conversion module 151 passes the converted image to the combining module 153.

The translation image generation module 152 is connected to the combining module 153, and generates an image of the translation result associated with the writing, so as to be output in a format different from that of an image of a translation result that is not associated with a writing. Then, the translation image generation module 152 passes the generated image to the combining module 153. For example, specifically, the translation image generation module 152 may generate an image that hides the translation result associated with the writing. This is used in the case where it is intended to hide the translation image while ensuring the quality of the translation result. For example, if a character of the original image is hidden, the character is eliminated from a process target, so that when character recognition and translation are performed, the quality of the translation result would be degraded. However, in this exemplary embodiment, character recognition and translation are also performed on a part where the original image is to be hidden, and a part of the translation result corresponding to the part to be hidden is hidden.

Moreover, the translation image generation module 152 may generate an image of the translation result associated with the writing, based on the type of the writing detected by the writing detection module 121. For example, specifically, when the writing is red, the translation result associated with the writing is painted out with black, and when the writing is blue, the translation result associated with the writing is replaced by a predetermined character.

Moreover, the translation image generation module 152 may add a writing having the same type as that of the writing detected by the writing detection module 121, to the image of the translation result associated with the writing. For example, specifically, when the writing is made by a red marker, an image that is painted out with an equivalent red marker is added to the translation result associated with the writing. Likewise, when the writing is a blue underline, an equivalent underline is added to the translation result associated with the writing. This process is performed when the association relation between the original image and the translation image is to be clarified.

The combining module 153 is connected to the original image conversion module 151 and the translation image generation module 152, and combines the image converted by the original image conversion module 151 and the image generated by the translation image generation module 152. The combining module 153 passes the combined image to the output module 160.

When only the translation image is output, the original image conversion module 151 and the combining module 153 are unnecessary. In that case, the image generated by the translation image generation module 152 is passed to the output module 160.

The output module 160 is connected to the image generation module 150. The output module 160 receives the image from the image generation module 150, and outputs the image. Outputting an image includes printing it with a printing machine such as a printer, displaying it on a display, transmitting it with an image transmission apparatus such as a fax, and writing it into an image storage such as an image database.

Figure 2:
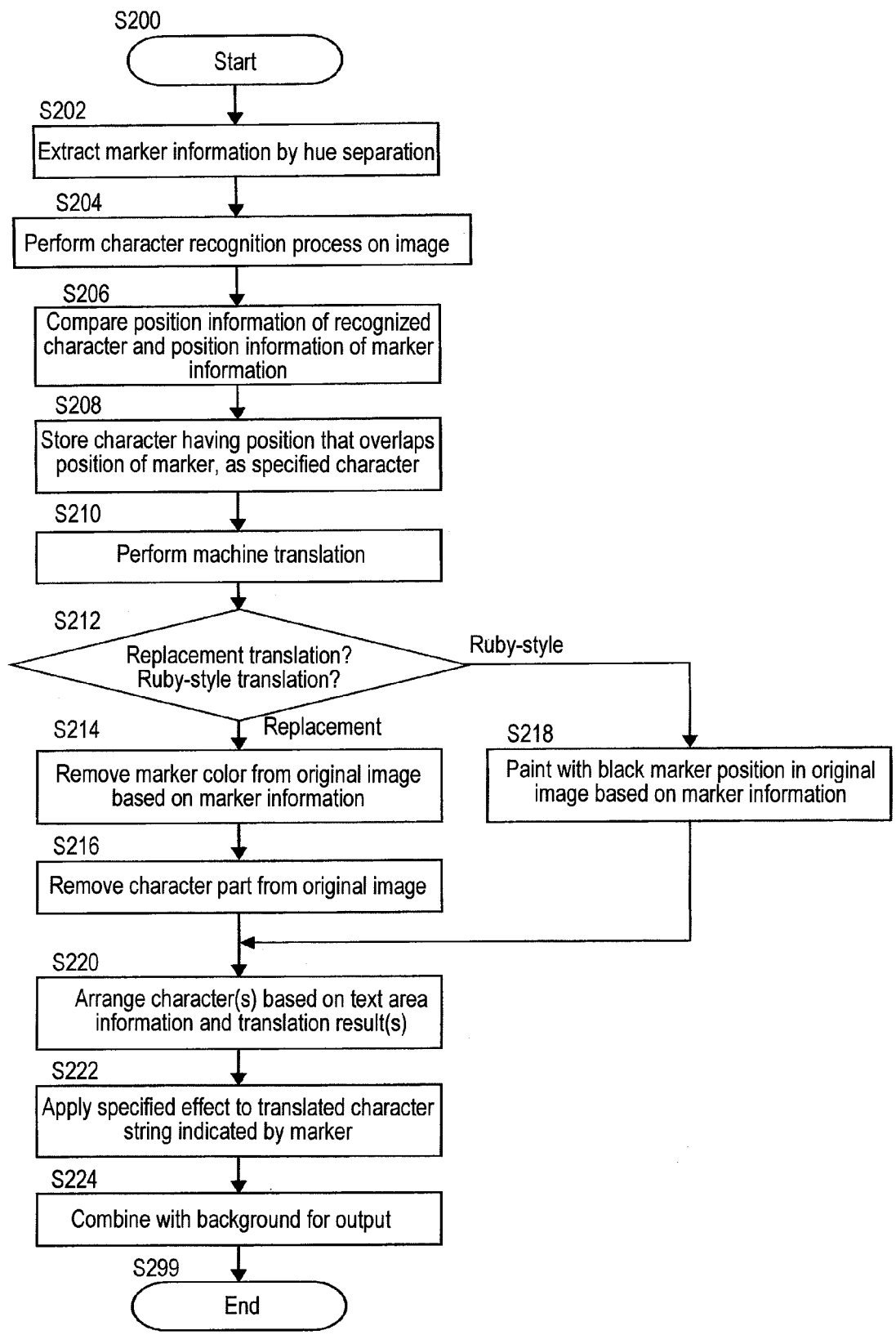
FIG. 2 is a flowchart showing a processing example 1 according to the exemplary embodiment of the invention.

FIG. 2 is a flowchart showing a processing example 1 according to this exemplary embodiment. A target of this processing example 1 is an image where a writing has been made for hiding, and the processing example 1 hides a corresponding character image in a translation image. This is used, for example, in the case where a piece of information described in a document is hidden when the document is made open to the public in a different language.

At step S202, the writing detection module 121 performs the hue separation on an image received by the image receiving module 110 to thereby extract marker information including a position of a marker that is a writing made by a user. The marker information may include a color of the marker in addition to the position thereof.

At step S204, the layout detection module 123 extracts a text area from the image received by the image receiving module 110, and extracts a position of a character image. Then, the character recognition module 124 performs the character recognition process on the character image located in the position of the character image.

At step S206, the association module 130 compares the position information of the character image, which recognized as a character(s) at step S204, with position information that is contained in the marker information extracted at step S202.

At step S208, the association module 130 stores, as a specified character, a character having a position that overlaps the position of the marker. For example, more specifically, the character painted out with the marker is surrounded by tags, and the character recognition result is described in HTML.

At step S210, the translation module 140 executes the machine translation. Herein, the translation module 140 passes the result of the machine translation to a next process in a format that is clearly recognized as a translation result of the character, which is painted out with the marker. For example, more specifically, the translation result of the character, which is painted out with the marker, is surrounded by tags, and the translation result is described in HTML.

At step S212, the image generation module 150 determines as to which to choose as an output format (i) replacement translation (an output in which the character image of the original image is not left but overwritten with the translation result, see FIG. 5B) or (ii) ruby-style translation (an output in which the character image of the original image is left as it is and the translation result is associated like ruby characters, see FIG. 6B). This determination is made according to a user's operation or a predetermined output format in this exemplary embodiment.

At step S214, using the marker information extracted at step S202, the original image conversion module 151 removes an area having the color of the marker from the image received by the image receiving module 110.

At step S216, the original image conversion module 151 further removes a character part from the image. That is, by the processes of steps S214 and S216, the character image part is removed from the image. Thereby, images other than the character image (for example, a figure and a photo image) are left in the image.

At step S218, using the marker information extracted at step S202, the original image conversion module 151 paints out with black or the like the character image located in the marker position in the image received by the image receiving module 110. That is, since this is a case where the original image is output as well, the character painted with the marker is hidden. It is to be noted that this includes replacing the character, which is painted with the marker, by an image of a predetermined character string instead of painting it out with black.

At step S220, the translation image generation module 152 arranges the character images of the translation result so as to correspond to the text area of the original image. In doing this, in the case where the output format is the replacement translation, the translation image generation module 152 arranges the character images of the translation result in the text area according to the language of the translation result. In the case where the output format is the ruby-style translation, since the original character image is present in the text area, the translation image generation module 152 arranges the character images of the translation result between lines.

At step S222, the translation image generation module 152 provides a specified effect to the translation character string indicated by the marker (that is, the result of translation of the character painted out with the marker). Here, the specified effect is to hide the translation character string according to a type of the marker, and examples thereof include painting it out with black and replacing it by an image of a predetermined character string.

At step S224, the combining module 153 combines the background image generated at step S216 (the image from which the character image has been removed) or the image generated at step S218 (the image from which the character image painted out with the marker has been removed) and the image generated at step S222 (translation image). Then, the output module 160 outputs the combined image.

FIGS. 5A and 5B are explanatory views showing the processing example 1-1 according to this exemplary embodiment. Specifically, FIGS. 5A and 5B show a processing example when the replacement translation is chosen at step S212 of the flowchart shown in the example of FIG. 2. An original image 510 shown in the example of FIG. 5A is the image received by the image receiving module 110 of this exemplary embodiment, and a translation image 520 shown in the example of FIG. 5B is an image output by the output module 160 of this exemplary embodiment. It is noted that Japanese characters are left in FIG. 5A intentionally because FIG. 5B shows a result of translating the Japanese document shown in FIG. 5A into English.

The original image 510 shown in the example of FIG. 5A includes a marker area 511 and a marker area 512. That is, character strings "watashitachi ga mezasu mono" (511; means that the thing which we aim at) and "watashitachi ga taisetunisuru koto" (512; means that we value) that a user does not want to disclose are painted out with markers. It is assumed that the marker area 511 and the marker area 512 are writings that are made with markers having different colors.

The translation image 520 shown in the example of FIG. 5B in which the original image 510 is translated after character recognition includes a masking area 521 and masking areas 522A and 522B. In the masking area 521, the translation part of the marker area 511 is hidden with black according to the color of the marker area 511, and in the masking areas 522A and 522B, the translation part of the marker area 512 is hidden by replacing it by "words A" that is associated with the color.

FIGS. 6A and 6B are explanatory views showing a processing example 1-2 according to this exemplary embodiment. FIGS. 6A and 6B show a processing example when the ruby-style translation is chosen at step S212 of the flowchart shown in the example of FIG. 2. An original image 610 shown in the example of FIG. 6A is an image received by the image receiving module 110 of this exemplary embodiment, and a translation image 620 shown in the example of FIG. 6B is an image output by the output module 160 of this exemplary embodiment. It is noted that Japanese characters are left in FIGS. 6A and 6B intentionally because FIG. 6B shows a result of translating the Japanese document shown in FIG. 6A into English.

The original image 610 includes a marker area 611 and a marker area 612. These are equivalent to the original image 510 shown in the example of FIG. 5A.

In the translation image 620 in which the original image 610 is translated after character recognition, translations are shown between lines of character strings in the original image 610. The translation image 620 includes a masking area 621, masking areas 622A and 622B, a masking area 631, and a masking area 632. That is, the masking area 631 and the masking area 632 hides the marker area 612 and the marker area 611 of the original image 610, and the masking area 621 and the masking areas 622A and 622B hide the translation part of the marker area 612 and the translation part of the marker area 611. The formats of the masking area 621 and the masking areas 622A and 622B are made different from each other according to the colors of the marker area 612 and the marker area 611.

Figure 7:
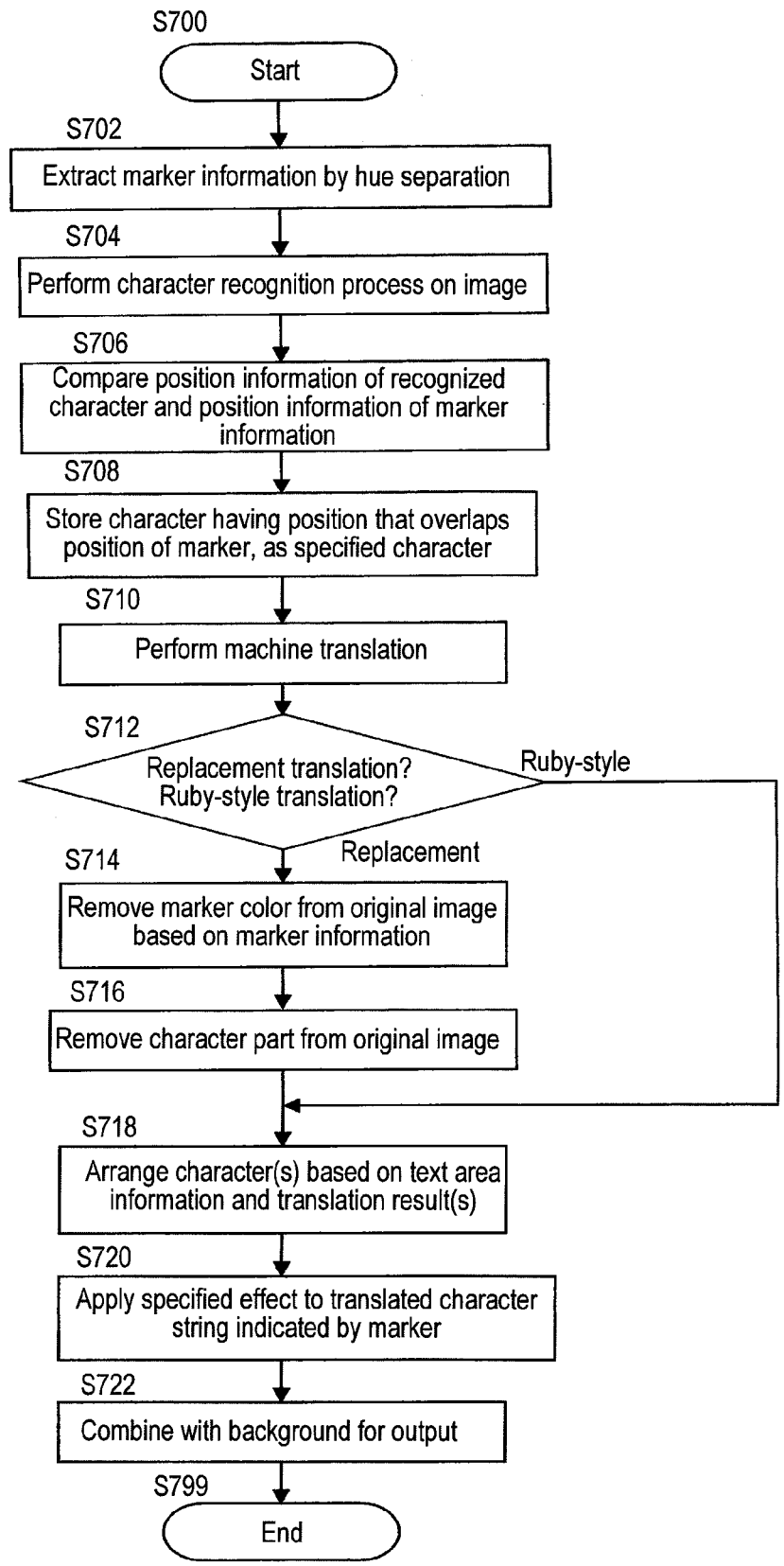
FIG. 7 is a flowchart showing a processing example 2 according to the exemplary embodiment of the invention.

FIG. 7 is a flowchart showing a processing example 2 according to this exemplary embodiment. A target of this processing example 2 is an image where a writing is made for indicating that that part is important, attracting attention, or the like, and the processing example 2 displays a corresponding character image in a translation image differently from a character image where no writing is made. This processing example 2 is used, for example, in a case where a writing in a document is shown in association with a translated document when the document is translated.

Comparing the flowchart shown in the example of FIG. 7 with the flowchart shown in the example of FIG. 2, the processes of steps S702 to S716 are similar to those of steps S202 to S216, the processes of steps S718 to S722 are similar to those of steps S220 to S224, and no process corresponding to step S218 is present. This is because a part where a writing has been made on an original image with a marker is left as it is in the processing example 2 shown in FIG. 7, while the processing example 1 shown in FIG. 2 is to hide a writing part and it is necessary for the processing example 1 to hide a part where a writing has been made on an original image with a marker.

When it is determined that the ruby-style translation is chosen at step S712, since the process shifts to step S718, that is, since no process corresponding to step S218 is required, the process performed by the original image conversion module 151 is unnecessary.

FIGS. 8A and 8B are explanatory views showing a processing example 2-1 according to this exemplary embodiment. This is a processing example when the replacement translation is chosen at step S712 of the flowchart shown in the example of FIG. 7. An original image 810 shown in the example of FIG. 8A is an image received by the image receiving module 110 of this exemplary embodiment, and a translation image 820 shown in the example of FIG. 8B is an image output by the output module 160 of this exemplary embodiment. It is noted that Japanese characters are left in FIG. 8A intentionally because FIG. 8B shows a result of translating the Japanese document shown in FIG. 8A into English.

The original image 810 shown in the example of FIG. 8A includes a marker area 811 and a marker area 812. These are similar to the original image 510 shown in the example of FIG. 5A. That is, a writing with a marker is made by a user on each of the character strings "watashitachi ga mezasu mono" (811; means that the thing which we aim at) and "watashitachi ga taisetunisuru koto" (812; means that we value). The marker area 811 and the marker area 812 are writings with markers having different colors. These character strings are not objects to be hidden but objects to be recognized as important or to which attention should be paid.

The translation image 820 shown in the example of FIG. 8B in which the original image 810 is translated after character recognition includes a character modification 821 and character modifications 822A and 822B. In the character modification 821, an image of the writing, that is, an area having an equivalent color to that of the marker area 812 is added according to the color of the marker area 812. In the character modifications 822A and 822B, according to the color of the marker area 811, a writing image of an underline associated with that color is added.

FIGS. 9A and 9B are explanatory views showing a processing example 2-2 according to this exemplary embodiment. This is a processing example when the ruby-style translation is chosen at step S712 of the flowchart shown in the example of FIG. 7. An original image 910 shown in the example of FIG. 9A is an image received by the image receiving module 110 of this exemplary embodiment, and a translation image 920 shown in the example of FIG. 9B is an image output by the output module 160 of this exemplary embodiment. It is noted that Japanese characters are left in FIGS. 9A and 9B intentionally because FIG. 9B shows a result of translating the Japanese document shown in FIG. 9A into English.

The original image 910 shown in the example of FIG. 9A includes a marker area 911 and a marker area 912. These are similar to the original image 810 shown in the example of FIG. 8A.

In the translation image 920 shown in the example of FIG. 9B in which the original image 910 is translated after character recognition, translations are shown between lines of character strings in the original image 910. The translation image 920 includes a character modification 921, character modifications 922A and 922B, a character modification 931, and a character modification 932. That is, the character modification 931 and the character modification 932 are the marker area 912 and the marker area 911 of the original image 910 as they are, and the character modification 921 and the character modifications 922A and 922B are present in the corresponding translation parts. The formats of the character modification 921 and the character modifications 922A and 922B are made different according to the colors of the marker area 912 and the marker area 911.

Figure 10:
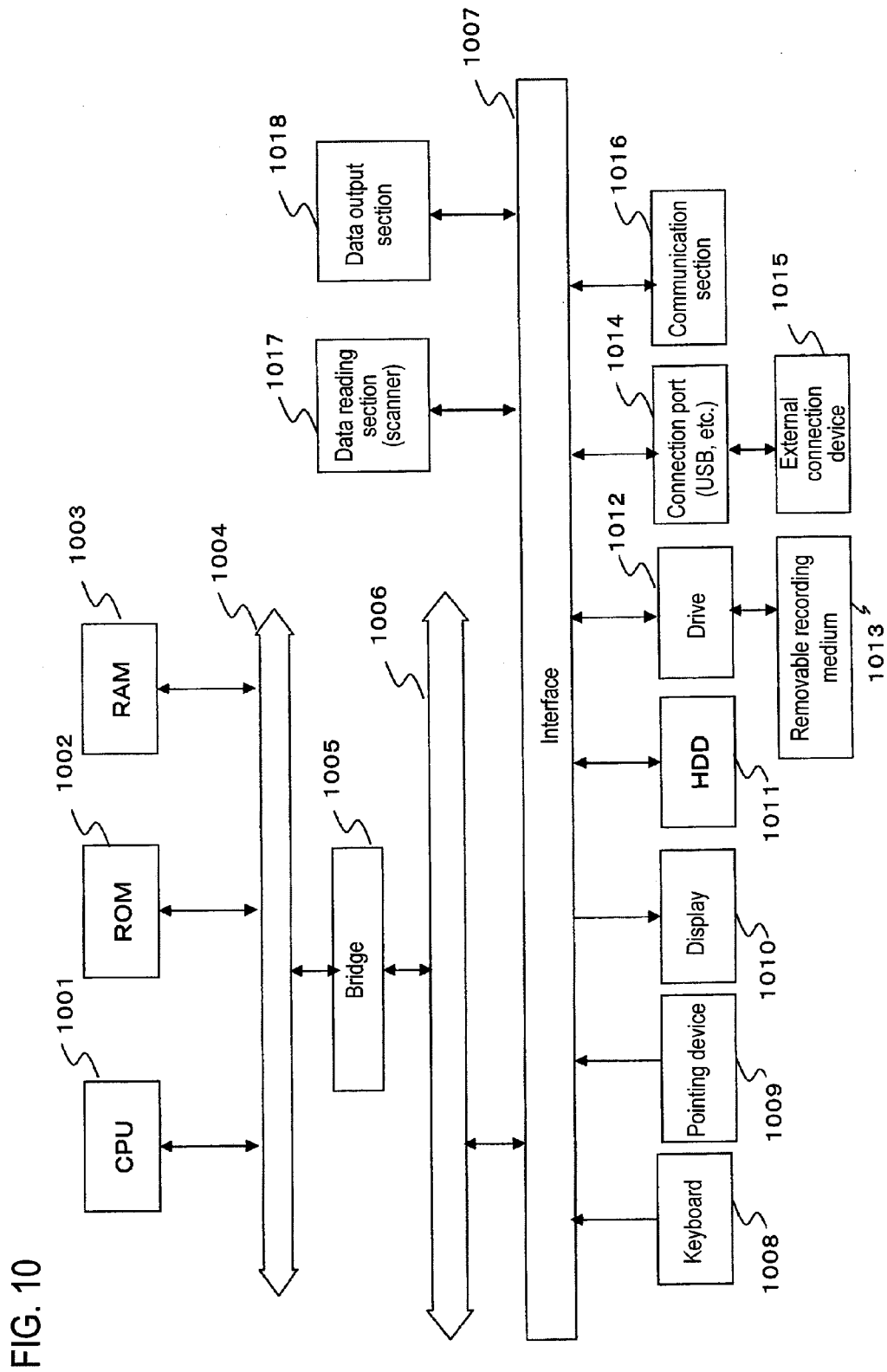
FIG. 10 is a block diagram showing an example of the hardware structure of a computer that implements the exemplary embodiment of the invention.

Referring to FIG. 10, a hardware structure example of this exemplary embodiment will be described. The structure shown in FIG. 10 is constituted by, for example, a personal computer (PC), and a hardware structure example is shown that includes a data reading section 1017 such as a scanner and a data output section 1018 such as a printer.

A CPU (central processing unit) 1001 is a control section that executes processings according to computer programs describing execution sequences of the modules described in the above-described embodiment, that is, the modules such as the extraction/recognition processing module 120, the association module 130, the translation module 140, and the image generation module 150.

A ROM (read only memory) 1002 stores programs, operation parameters, and the like used by the CPU 1001. A RAM (random access memory) 1003 stores programs used in the execution of the CPU 1001, parameters that appropriately varies in the execution, and the like. These are interconnected through a host bus 1004 constituted by a CPU bus or the like.

The host bus 1004 is connected to an external bus 1006 such as a PCI (peripheral component interconnect/interface) bus through a bridge 1005.

A keyboard 1008 and a pointing device 1009 such as a mouse are input devices operated by the operator. A display 1010 examples of which include a liquid crystal display and a CRT (cathode ray tube) display displays various pieces of information as text and image information.

An HDD (hard disk drive) 1011 incorporates a hard disk, and drives the hard disk to record or reproduce programs executed by the CPU 1001 and information. The hard disk stores images received by the image receiving module 110, the translation results by the translation module 140, and the like. Further, the hard disk stores other various data processing programs and various computer programs.

A drive 1012 reads data or a program recorded on an attached removable recording medium 1013 such as a magnetic disk, an optical disk, a magneto-optical disk, or a semiconductor memory, and supplies the data or the program to the RAM 1003 connected through an interface 1007, the external bus 1006, the bridge 1005, and the host bus 1004. The removable recording medium 1013 can also be used as a data recording area similar to the hard disk.

A connection port 1014 is for connecting an external connection device 1015, and includes connection sections such as USB and IEEE1394. The connection port 1014 is connected to the CPU 1001 and the like through the interface 1007, the external bus 1006, the bridge 1005, the host bus 1004, and the like. A communication section 1016 is connected to a network, and executes the processing of data communication with the outside. A data reading section 1017 is, for example, a scanner, and executes the processing of document reading. A data output section 1018 is, for example, a printer, and executes the processing of document data output.

The hardware structure shown in FIG. 10 is a structure example, and this exemplary embodiment is not limited to the structure shown in FIG. 10 but may adopt any hardware structure that is capable of executing the modules described in this exemplary embodiment. For example, some of the modules may be constituted by dedicated hardware such as an ASIC (application specific integrated circuit), some of the modules may be present in an external system and connected by a communication line, and further, a plurality of the systems shown in FIG. 10 may be interconnected by a communication line so as to operate in cooperation with each other. Moreover, this exemplary embodiment may be incorporated in a copier, a fax, a scanner, a printer, a multifunction apparatus (an image processing apparatus having two or more of the scanner, printer, copier, and fax functions), and the like.

The described programs may be provided by being stored in a recording medium, or the programs may be provided through a communication device. In that case, for example, the described programs may be regarded as an invention of a "computer-readable recording medium recording a program".

The "computer-readable recording medium recording a program" refers to a computer-readable recording medium recording a program which recording medium is used for installing and executing a program, distributing a program, or the like.

Examples of the recording medium include: DVDs (digital versatile disks) such as "DVD-R, DVD-RW, DVD-RAM" which are standards developed by the DVD forum and "DVD+R, DVD+RW" which are standards developed by DVD+RW; compact disks (CDs) such as a read-only memory (CD-ROM), a CD-recordable (CD-R), and a CD-rewritable (CD-RW); a blue-ray disk; a magneto-optical disk (MO); a flexible disk (FD); a magnetic tape; a hard disk; a read only memory (ROM); an electrically erasable and rewritable read only memory (EEPROM); a flash memory; and a random access memory (RAM).

The programs or some of them may be stored or distributed in a state of being recorded in the recording medium. Moreover, they may be transmitted through communication by using a transmission medium such as a wire network used for a local area network (LAN), a metropolitan area network (MAN), a wide-area network (WAN), the Internet, an intranet, and an extranet, a wireless communication network, or a combination thereof, or may be conveyed on a carrier wave.

Further, the programs may be part of other programs, or may be recorded in a recording medium with another program. Moreover, they may be recorded in a state of being divided to a plurality of recording media. Moreover, they may be recorded in any form such as a compressed form or an encrypted form as long as they are restorable.

What is claimed is:
1. An image processing apparatus comprising:
an image receiving unit that receives an image including a writing;
a writing detection unit that detects a position of the writing in the image received by the image receiving unit;

a character position detection unit that detects a position of a character image in the image received by the image receiving unit;

a character recognition unit that performs character recognition on the character image detected by the character position detection unit;

an association unit that compares the position of the writing detected by the writing detection unit with the position of the character image detected by the character position detection unit to associate the writing with a result of the character recognition performed by the character recognition unit;

a translation unit that translates the result of the character recognition performed by the character recognition unit so as to be recognizable as a translation of the result of the character recognition associated with the writing by the association unit;

a translation image generation unit that generates an image of the translation result associated with the writing, so as to be output in a format different from a format of an image of a translation result that is not associated with the writing;

a translation image output unit that outputs the image generated by the translation image generation unit;

an original image conversion unit that converts the character image in the image received by the image receiving unit, based on the position of the writing detected by the writing detection unit, after the translation by the translation unit is performed; and a combining unit that combines the image converted by the original image conversion unit and the image generated by the translation image generation unit.

2. The image processing apparatus according to claim 1, wherein the original image conversion unit converts the character image into an image that hides the character image, based on the position of the writing detected by the writing detection unit.

3. The image processing apparatus according to claim 1, wherein the translation image generation unit generates an image that hides the translation result associated with the writing.

4. The image processing apparatus according to claim 1, wherein
the writing detection unit further detects a type of the writing, and
the translation image generation unit generates the image of the translation result associated with the writing, based on the type of the writing detected by the writing detection unit.

5. The image processing apparatus according to claim 1, wherein
the writing detection unit further detects a type of the writing, and
the translation image generation unit adds a writing having a same type as the type of the writing detected by the writing detection unit, to the image of the translation result associated with the writing.

6. An image processing method comprising:
receiving an image in an image receiving unit, the image including a writing;
detecting a position of the writing in the received image;
detecting a position of a character image in the received image;
performing character recognition on the detected character image;
comparing the position of the detected writing with the position of the detected character image to associate the writing with a result of the character recognition;
translating the result of the character recognition so as to be recognizable as a translation of the result of the character recognition associated with the writing;
generating an image of the translation result associated with the writing, so as to be output in a format different from a format of an image of a translation result that is not associated with the writing;
outputting the image of the translation result associated with the writing to a translation image output unit;
converting the character image in the image received by the image receiving unit, based on the position of the writing detected, after the translation is performed; and
combining the image converted and the image generated, wherein outputting the image includes at least one of printing the image of the translation result with a printer, displaying the image of the translation result with a display, transmitting the image of the translation result with a fax machine, and writing the image of the translation result into an image database.

7. A non-transitory computer-readable medium storing a program that causes a computer to execute image processing, the image processing comprising:
receiving an image in an image receiving unit, the image including a writing;
detecting a position of the writing in the received image;
detecting a position of a character image in the received image;
performing character recognition on the detected character image;
comparing the position of the detected writing with the position of the detected character image to associate the writing with a result of the character recognition;
translating the result of the character recognition so as to be recognizable as a translation of the result of the character recognition associated with the writing;
generating an image of the translation result associated with the writing, so as to be output in a format different from a format of an image of a translation result that is not associated with the writing;
outputting the image of the translation result associated with the writing to a translation image output unit;
converting the character image in the image received by the image receiving unit, based on the position of the writing detected, after the translation is performed; and
combining the image converted and the image generated, wherein outputting the image includes at least one of printing the image of the translation result with a printer, displaying the image of the translation result with a display, transmitting the image of the translation result with a fax machine, and writing the image of the translation result into an image database.

8. An image processing apparatus comprising:
an image receiving unit that receives an image including a writing;
a writing detection unit that detects a position of the writing in the image received by the image receiving unit;
a character position detection unit that detects a position of a character image in the image received by the image receiving unit;
a character recognition unit that performs character recognition on the character image detected by the character position detection unit;
an association unit that compares the position of the writing detected by the writing detection unit with the position of the character image detected by the character position detection unit to associate the writing with a result of the character recognition performed by the character recognition unit;

a translation unit that translates the result of the character recognition performed by the character recognition unit so as to be recognizable as a translation of the result of the character recognition associated with the writing by the association unit;

a translation image generation unit that generates an image of the translation result associated with the writing, so as to be output in a format different from a format of an image of a translation result that is not associated with the writing; and a translation image output unit that outputs the image generated by the translation image generation unit, wherein the translation image generation unit generates an image that hides the translation result associated with the writing.

9. An image processing method comprising:

receiving an image in an image receiving unit, the image including a writing;

detecting a position of the writing in the received image;

detecting a position of a character image in the received image;

performing character recognition on the detected character image;

comparing the position of the detected writing with the position of the detected character image to associate the writing with a result of the character recognition;

translating the result of the character recognition so as to be recognizable as a translation of the result of the character recognition associated with the writing;

generating an image of the translation result associated with the writing, so as to be output in a format different from a format of an image of a translation result that is not associated with the writing; and outputting the image of the translation result associated with the writing to a translation image output unit, wherein outputting the image includes at least one of printing the image of the translation result with a printer, displaying the image of the translation result with a display, transmitting the image of the translation result with a fax machine, and writing the image of the translation result into an image database, and wherein generating the image includes hiding the translation result associated with the writing.

10. A non-transitory computer-readable medium storing a program that causes a computer to execute image processing, the image processing comprising:

receiving an image in an image receiving unit, the image including a writing;

detecting a position of the writing in the received image;

detecting a position of a character image in the received image;

performing character recognition on the detected character image;

comparing the position of the detected writing with the position of the detected character image to associate the writing with a result of the character recognition;

translating the result of the character recognition so as to be recognizable as a translation of the result of the character recognition associated with the writing;

generating an image of the translation result associated with the writing, so as to be output in a format different from a format of an image of a translation result that is not associated with the writing; and outputting the image of the translation result associated with the writing to a translation image output unit, wherein outputting the image includes at least one of printing the image of the translation result with a printer, displaying the image of the translation result with a display, transmitting the image of the translation result with a fax machine, and writing the image of the translation result into an image database, and wherein generating the image includes hiding the translation result associated with the writing.

* * * * *